(12) United States Patent
Lueddecke et al.

(10) Patent No.: US 10,570,914 B2
(45) Date of Patent: Feb. 25, 2020

(54) COMPRESSOR AND METHOD FOR MOUNTING OF A COMPRESSOR

(71) Applicant: Rolls-Royce Deutschland Ltd & Co KG, Blankenfelde-Mahlow (DE)

(72) Inventors: Jens Lueddecke, Berlin (DE); Steffen Drevs, Berlin (DE)

(73) Assignee: Rolls-Royce Deutschland Ltd & Co KG, Blankenfelde-Mahlow (DE)

( * ) Notice: Subject to any disclaimer, the term of this patent is extended or adjusted under 35 U.S.C. 154(b) by 703 days.

(21) Appl. No.: 15/244,649

(22) Filed: Aug. 23, 2016

(65) Prior Publication Data

US 2017/0184118 A1    Jun. 29, 2017

(30) Foreign Application Priority Data

Aug. 24, 2015   (DE) .................. 10 2015 216 110

(51) Int. Cl.
*F04D 29/32* (2006.01)
*F01D 5/08* (2006.01)
(Continued)

(52) U.S. Cl.
CPC ........... *F04D 29/321* (2013.01); *F01D 5/087* (2013.01); *F02C 6/08* (2013.01); *F04D 19/02* (2013.01);
(Continued)

(58) Field of Classification Search
None
See application file for complete search history.

(56) References Cited

U.S. PATENT DOCUMENTS

| | | |
|---|---|---|
| 3,742,706 A | 7/1973 | Klompas |
| 4,415,310 A | 11/1983 | Bouiller et al. |

(Continued)

FOREIGN PATENT DOCUMENTS

| | | |
|---|---|---|
| DE | 102004042295 A1 | 3/2006 |
| DE | 102004006775 A1 | 10/2006 |

(Continued)

OTHER PUBLICATIONS

German Search Report dated May 12, 2016 for counterpart German Application No. 10 2015 216 110.2.

(Continued)

*Primary Examiner* — David E Sosnowski
*Assistant Examiner* — Juan G Flores
(74) *Attorney, Agent, or Firm* — Shuttleworth & Ingersoll, PLC; Timothy Klima

(57) ABSTRACT

A compressor for a turbomachine, with at least one rotor disc and a space that is at least partially enclosed by the at least one rotor disc and that is arranged axially in front of or behind the at least one rotor disc, wherein vortex reducers are arranged inside the space, wherein the vortex reducers are connected to the structural components in a form-fitted and/or in a frictionally engaged manner partially via first scallops at a first structural component and partially via second scallops at a second structural component that is adjacent to the first structural component in the axial direction, wherein the first scallops and/or second scallops are arranged at a retaining ring, which can be connected or is connected to the first rotor disc and/or the second rotor disc. What is further described is a method for mounting a compressor.

11 Claims, 13 Drawing Sheets

(51) Int. Cl.
 *F02C 6/08* (2006.01)
 *F04D 19/02* (2006.01)
 *F04D 29/64* (2006.01)
(52) U.S. Cl.
 CPC .... *F04D 29/644* (2013.01); *F05D 2220/3216* (2013.01); *F05D 2260/36* (2013.01); *F05D 2260/37* (2013.01); *F05D 2300/50212* (2013.01); *Y02T 50/676* (2013.01)

(56) References Cited

U.S. PATENT DOCUMENTS

| | | | |
|---|---|---|---|
| 4,844,694 | A | 7/1989 | Naude |
| 4,919,590 | A | 4/1990 | Stratford et al. |
| 5,236,302 | A | 8/1993 | Weisgerber et al. |
| 5,472,313 | A | 12/1995 | Quinones et al. |
| 7,086,830 | B2 * | 8/2006 | Fitzgerald ............... F01D 5/082 415/115 |
| 7,344,354 | B2 | 3/2008 | Lammas et al. |
| 7,390,167 | B1 | 6/2008 | Bouiller et al. |
| 2002/0182059 | A1 | 12/2002 | Escure et al. |
| 2003/0101730 | A1 | 6/2003 | Hein et al. |
| 2004/0179936 | A1 | 9/2004 | Fitzgerald et al. |
| 2005/0172640 | A1 | 8/2005 | Drevs et al. |
| 2007/0108762 | A1 | 5/2007 | Buschmann et al. |
| 2007/0258813 | A1 | 11/2007 | Klutz |
| 2010/0266387 | A1 | 10/2010 | Bintz et al. |
| 2011/0058941 | A1 | 3/2011 | Behaghel et al. |
| 2014/0090397 | A1 | 4/2014 | Lund et al. |

FOREIGN PATENT DOCUMENTS

| | | |
|---|---|---|
| DE | 102005040575 A1 | 3/2007 |
| EP | 1318272 A2 | 6/2003 |
| EP | 1457640 A2 | 9/2004 |
| EP | 1783325 A1 | 5/2007 |
| EP | 2261467 A2 | 12/2010 |
| EP | 2410136 A2 | 1/2012 |
| EP | 2612988 A2 | 7/2013 |
| EP | 2617941 A1 | 7/2013 |
| EP | 2840230 A1 | 2/2015 |
| FR | 2614654 A1 | 11/1988 |
| FR | 2672943 A1 | 8/1992 |
| WO | WO2015024696 | 2/2015 |

OTHER PUBLICATIONS

European Search Report dated Jan. 20, 2017 for counterpart European Application No. 16183865.1.

* cited by examiner

COMPRESSOR AND METHOD FOR MOUNTING OF A COMPRESSOR

REFERENCE TO RELATED APPLICATION

This application claims priority to German Patent Application DE102015216110.2 filed Aug. 24, 2015, the entirety of which is incorporated by reference herein.

DESCRIPTION

The invention relates to a compressor and a method for mounting a compressor with features as disclosed herein.

It is known from DE 10 2004 006 775 A1 to arrange vortex reducers in tube design in a space between two rotor discs of a compressor of a gas turbine. The goal is to influence the turbulence of the flow in the space between the rotor discs with the help of vortex reducers.

The objective is to find constructional designs for vortex reducers that are in particular easy to mount.

The objective is achieved by means of the compressor with the features of claim 1.

The compressor for a turbomachine has at least one rotor disc with compressor blades. A space is arranged axially in front or behind the at least one rotor disc, with vortex reducers being arranged inside that space. Here, the vortex reducers are connected to the structural components partially via first scallops at a first structural component and partially via second scallops at a second structural component that is adjacent to the first structural component in the axial direction in a form-fitted manner and/or in a frictionally engaged manner, wherein the first scallops and/or the second scallops are arranged inside a retaining ring, which can be connected or is connected to the first rotor disc and/or the second rotor disc.

Thus, the vortex reducers are respectively arranged on two sides inside scallops that are provided in different structural components. Here, the scallops respectively surrounds one part of the vortex reducers, so that, when assembled, both scallops ensure a form-fitted and/or frictionally engaged connection. Thus, during mounting the vortex reducers can e.g. be inserted into one of the scallops and then be fixed with the other scallops during the assembly. By distributing the scallops, fast and efficient mounting is facilitated.

A structural component having the scallops can e.g. be a first rotor disc or a retaining ring. The other, adjacent structural component can for example be a second rotor disc or a structural component, e.g. as a part of the compressor housing.

By using a retaining ring, a special adjustment to the characteristics of the flow within the space between two rotor discs, to the respective rotor disc load and geometry and/or the material can be carried out. Also, the retaining ring for example absorbs centrifugal loads, such that the rotor disc loads are reduced. In addition, the retaining ring seals the space against a hub (interstage) cavity.

Advantageously, the connection of the vortex reducers via the scallops is embodied as a clamp-connection. Here, it is particularly advantageous if the connection of the vortex reducers via the scallops is designed as a press fit and/or a transition fit. The press fit or transition fit do not have to be present at the scallops themselves, but can for example be present in the connection elements of the rotor discs.

It is also advantageous if form-fitting means, in particular platforms at the vortex reducer and/or grooves in the rotor discs or the retaining ring are provided in order to connect the vortex reducers to the scallops in a form-fitted manner or to hold them in place there in a form-fitted manner. At the same time, this form fit between the vortex reducer and the scallops inside the rotor discs and/or the retaining ring functions as an anti-rotation device for the retaining ring.

In one embodiment, the connection between the retaining ring and the first rotor disc, that is, the upstream rotor disc, is achieved via a clearance fit or transition fit. It is also possible that a connection between the retaining ring and the second rotor disc, that is, the downstream rotor disc, is achieved via a press fit.

In further embodiments, the fits can be adjusted to the materials of the rotor discs. If rotor discs of different materials are present, in particular having different strength, stiffness and/or thermal expansion behavior, the retaining ring can be connected via a clearance fit to the rotor disc with the weaker material and/or the smaller thermal expansion coefficient. If rotor discs of different materials are present, in particular materials having different strength, stiffness and/or thermal expansion behavior, the retaining ring can be connected via a press fit and/or a transition fit to the rotor disc with the stronger, stiffer and material/or the higher thermal expansion coefficient.

For operation and assembly, it is possible that the vortex reducers are combined with means for rotation prevention. If the vortex reducers are embodied in tube design, for example, any rotation inside the scallops is avoided by these means. Here, the anti-rotation feature is embodied at each of the vortex reducers as a circumferential ring that has at least one planar face which during assembly abuts against a wall, for example of a rotor disc or of the retaining ring, for the purpose of providing rotation prevention.

It is advantageous if the vortex reducers are embodied in tube design. In this case, the pressure ratio between the inlet and the outlet of the small tube can be adjusted in a targeted manner via the internal geometry of the tube of the vortex reducer.

In a further design, the retaining ring is connected via a force-fitted and/or a form-fitted connection to the first rotor disc, in particular via a connection of a circumferential projection of the first rotor disc to a circumferential second groove of the retaining ring or a conical seating.

Further, the radially inner, wider area is embodied in an asymmetrical manner in at least one rotor disc. The asymmetry particularly relates to the central plane of the at least one rotor disc.

The objective is achieved by a turbomachine and a method with features as disclosed herein.

In the method for mounting a compressor with vortex reducers, the compressor has at least one rotor disc and one space that is at least partially enclosed by the at least one rotor disc and that serves for receiving the vortex reducers.

During assembly, the at least one first rotor disc and an axially adjacent structural component with scallops are initially provided, wherein the first scallops and/or the second scallops are arranged at a retaining ring that can be connected or is connected to the first rotor disc and/or the second rotor disc.

Subsequently, the vortex reducers are inserted into the first scallops or the second scallops.

Then, either the axially adjacent second structural component with the second scallops is connected to the first structural component with the first scallops, or the first structural component with the first scallops is connected to the axially adjacent structural component with the second scallops.

By these means, the vortex reducers can be inserted into one of the scallops first, wherein the scallop that is complementary thereto is subsequently assembled with the respectively other scallop, so that after the connection the vortex reducers are attached via the scallops in a form-fitted and/or in a force-fitted manner in any case.

The invention is explained in connection with the exemplary embodiments that are shown in the figures. Herein:

Figure 1:
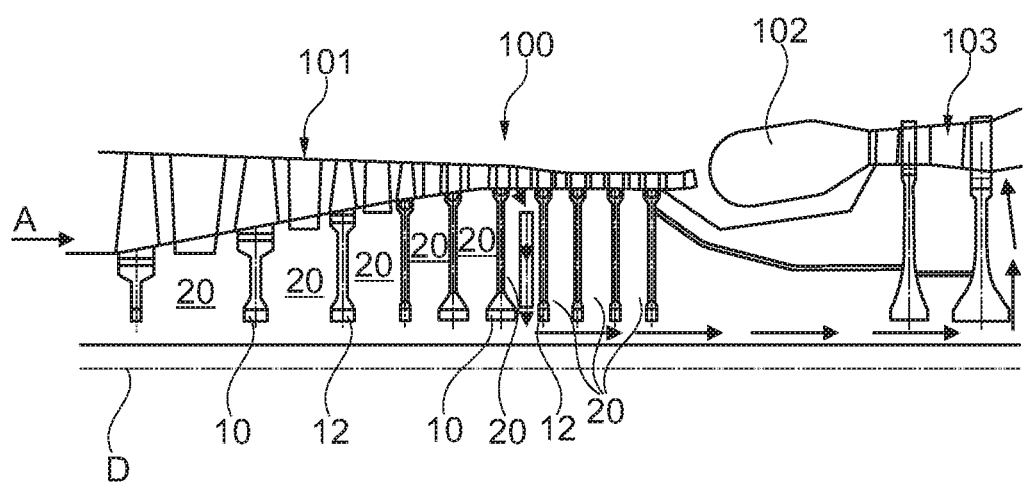
FIG. 1 shows a schematic partial rendering of a turbomachine, namely of an aircraft engine with a compressor.

What is shown in FIG. 1 is a schematic sectional view of a part of a turbomachine, namely of an aircraft engine 100. Here, a part of a compressor 101 is shown in an enlarged manner, with the compressor 101 having ten stages. This means that ten rotor discs 10, 12 with compressor blades as well as corresponding stators with stator blades are provided in the compressor 101. Respectively one space 20, which can also be referred to as interstage cavity, is arranged between two rotor discs 10, 12. Thus, the space 20 is laterally enclosed by the rotor discs 10, 12. The rotational axis D of the compressor 101 is shown as a dot-dashed line.

Combustion chambers 102 and a turbine 103, of which only two turbine blades are shown in FIG. 1, are arranged behind the compressor 101 as viewed axially in flow direction A.

In the embodiment that is shown here, vortex reducers 1, which in the present case are embodied in tube design, are arranged in the sixth stage of the compressor 101, that is, in the sixth space 20 (as counted in flow direction A). The flow passes the vortex reducers 1 in a per se known manner in the radial direction, as is schematically indicated by arrows in FIG. 1. A flow that is oriented in the direction of the turbine 103 is present in the area of the rotor disc hub.

Figure 6:
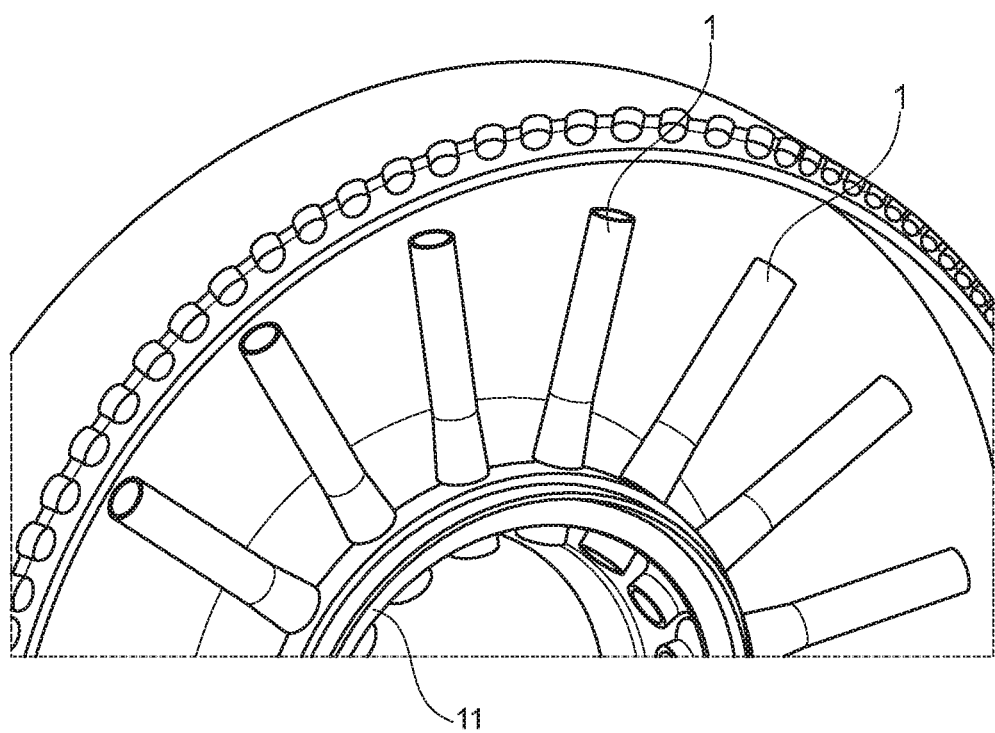
FIG. 6 shows a perspective view of the second mounting state with a plurality of vortex reducers.

Due to the sectional plane, only one vortex reducer 1 can be seen in FIG. 1. The vortex reducers 1 are arranged inside the space 20 in the radial direction, wherein the vortex reducers 1 are arranged in an evenly distributed manner in the circumferential direction, that is, with the same angular distance (see for example FIG. 6 or 9). A retaining ring 11, which is arranged between two rotor discs 10, 12 in the following, is not shown here for reasons of simplicity.

The space 20 is arranged here respectively between two rotor discs 10, 12 in the axial direction; that is, the space 20 is defined by the rotor discs 10, 12. Here, a first rotor disc 10 is located axially in front of the second rotor disc 12.

In other embodiments, the space 20 can also be defined by only one rotor disc 10. The other definition may for example be provided by a housing part of the compressor 10.

Figure 2:
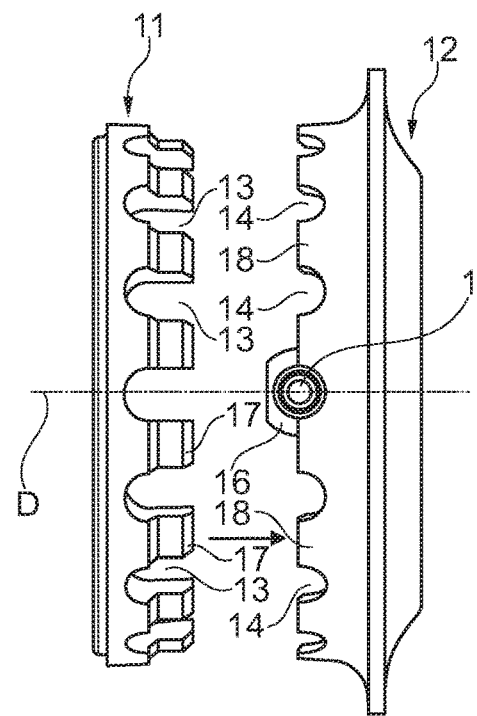
FIG. 2 shows a sectional rendering of an embodiment of a compressor during mounting with two structural components (retaining ring, second rotor disc) and a vortex reducer in a first mounting state.
Figure 3:
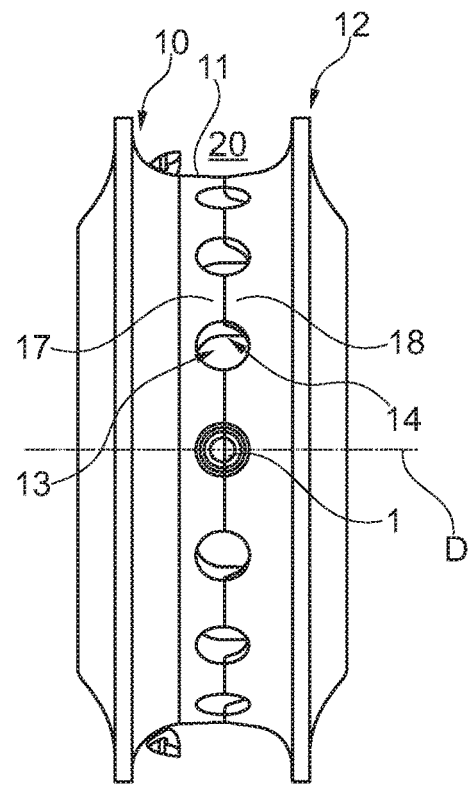
FIG. 3 shows a sectional rendering of an embodiment of a compressor during mounting with three structural components (retaining ring, first and second rotor disc) and a vortex reducer in a second mounting state.

In FIGS. 2 and 3, the assembly of vortex reducers 1 in one embodiment is shown in lateral views. Here, FIG. 2 shows a first assembly state and FIG. 3 a second assembly state that occurs at a later point in time, that is, the final state.

Here, FIGS. 2 and 3 show the radially inner structural components, that is, the hub areas of the rotor discs 10, 12 in the widest sense, wherein the first rotor disc 10 is not shown in FIG. 2. Rather, the first scallops 13 are arranged in a retaining ring as a first structural component 11. The retaining ring 11 can be connected to the first rotor disc 10. Here, the first rotor disc 10 is arranged upstream of the second rotor disc 12.

On one side, the retaining ring 11 has first scallops 13 around the circumference. Representing the second structural component, the second rotor disc 12 has opposite, complementary second scallops 14 around the circumference. During assembly (see FIG. 3) the scallops 13, 14 form substantially round openings for retaining the vortex reducers 1, which are embodied in tube design in the present case. For reasons of clarity, FIGS. 2 and 3 show only one vortex reducer 1.

Here, the retaining ring 11 is arranged in the transitional area between the rotor disc hub and the so-called membrane (diaphragm) of the rotor discs 10, 12.

The first projections 17 are arranged between the first scallops 13 in the circumferential direction of the retaining ring 11 and are contoured in the radial direction. Here, the projections 17 are configured to be slightly more flat at the tips, which are oriented towards the second rotor disc 12, such that they fit below the second projections 18 of the second rotor disc 12. The front side of the second rotor disc 12 is correspondingly formed in a complementary manner, as can be seen in the assembly according to FIG. 3. Through the assembly of the retaining ring 11 as the first structural component with the rotor disc as the second structural component 12 openings are created by the scallops 13, 14, inside of which the vortex reducers 1 can be retained.

A vortex reducer 1 is arranged inside the second rotor disc 12, and after assembly is connected in a form-fitted and/or in a frictionally engaged manner to the rotor discs 10, 12 via the scallops 13, 14. In FIG. 3, the vortex reducer 1 is surrounded upstream by the first scallop 13 and is surrounded downstream by the second scallop 14.

In the embodiment that is shown here, the vortex reducer 1 comprises a means for rotation prevention 16 and for radial retention. In the present case, this means 16 is configured as a disc, which has one planar face on either of the sides that are facing towards the rotor discs 10, 12. After installation of the tube-shaped parts of the vortex reducers 1, these planar surfaces abut against the walls of the retaining ring 11 and/or the second rotor disc 12, such that the vortex reducers 1 cannot be rotated inside the scallops 13, 14 neither during nor after the assembly.

After the assembly, the vortex reducers 1 that are inserted into the complementary scallops 13, 14 function as an anti-rotation device of the retaining ring 11 in the circumferential direction, thus preventing any rotation of the ring around the axis D during operation.

In the axial direction, the vortex reducers 1 are retained inside the complementary scallops 13, 14 by means of the form fit and/or friction fit/force fit. The retaining ring 11 is fixed in the axial direction by the form fit and force fit (friction fit) between the two rotor discs 10, 12.

FIGS. 2 and 3 describe an embodiment in which a retaining ring 11 is used. Among other things, the retaining ring has a self-supporting function and absorbs the loads of the vortex reducers 1 that are created during operation by the centrifugal forces. In this way, the retaining ring reduces the loads transferred into the rotor discs 10, 12. In addition, the retaining ring seals the interstage cavity 20 against the hub area and thus reduces pressure losses in the vortex reducer 1, or facilitates a targeted manipulation of pressure and flow characteristics.

In the concrete case, the sealing is realized via a press fit to the rotor disc 12 and a clearance fit to the rotor disc 10. Here, the clearance fit (possibly also a transition fit) is designed in such a manner that it is completely closed during operation, sealing off the space 20 throughout the entire flight cycle.

Principally it is also possible to connect the rotor discs 10, 12 without the retaining ring 11, wherein the vortex reducers 1 would be clamped between the rotor discs. This works expediently if the rotor discs 10, 12 have the same material pairing.

Figure 4:
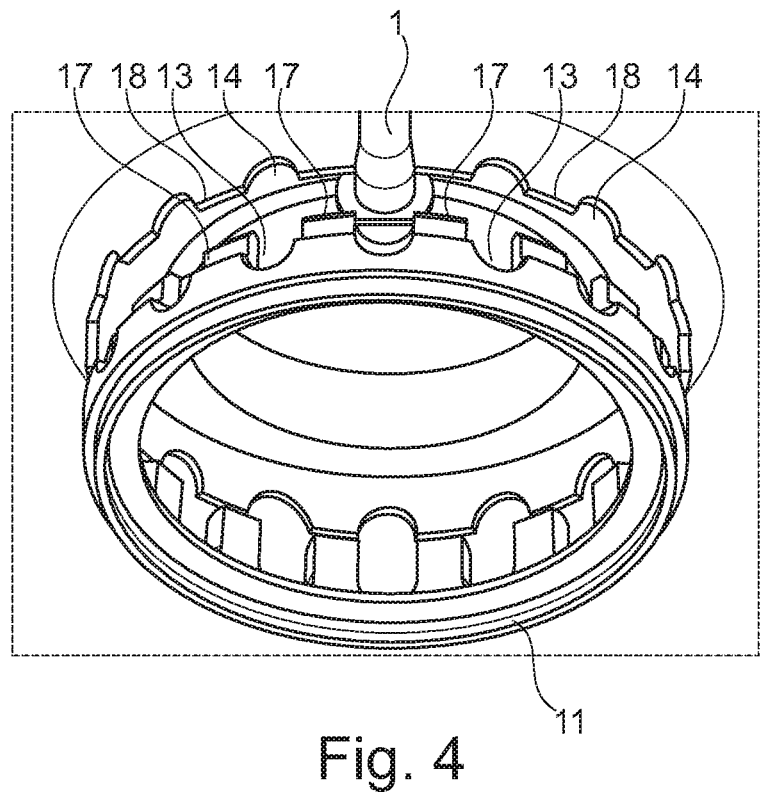
FIG. 4 shows a perspective view of the first mounting state according to FIG. 3.
Figure 5:
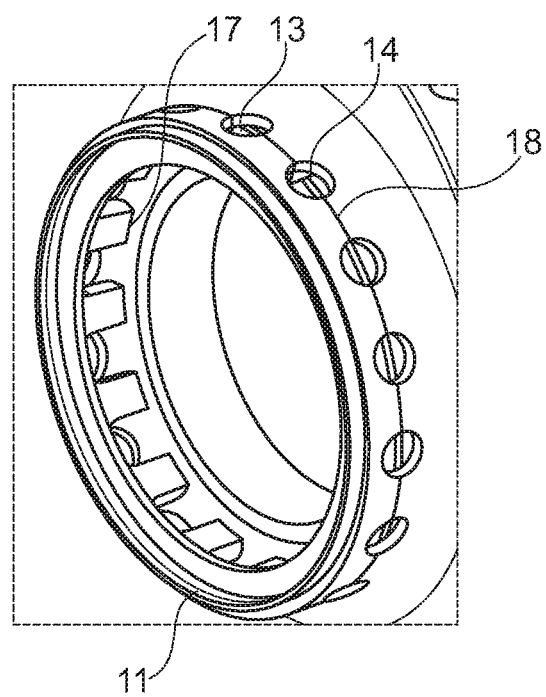
FIG. 5 shows a perspective view of the second mounting state according to FIG. 4.

FIGS. 4 and 5 show the two assembly states of an embodiment that is analogous to the embodiment shown in FIGS. 2 and 3. Here, a retaining ring 11 is again shown as a first structural component with the first scallops 13 that is connected to the first rotor disc 10 (not shown here).

However, principally it is also possible to arrange the first scallops 13 inside the first rotor disc 10 itself; in this case, the first rotor disc 10 would take over the function of the first structural component 11.

For reasons of clarity, only one vortex reducer 1 is shown in FIG. 4, and no vortex reducer is shown in FIG. 5.

Figure 7:
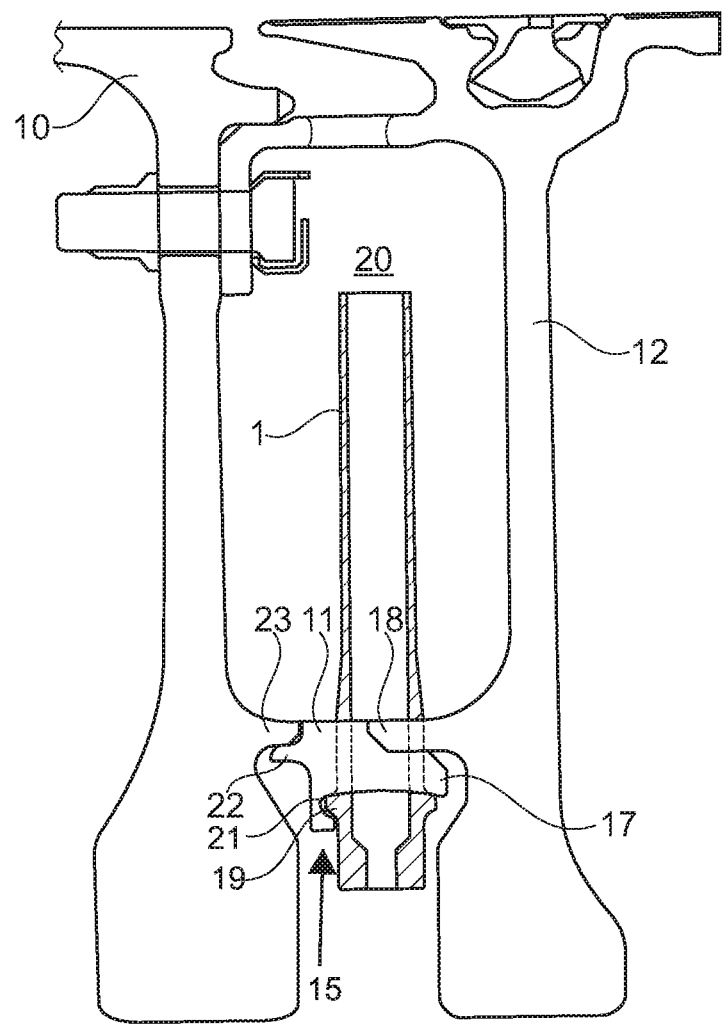
FIG. 7 shows a sectional drawing through the attachment area of a vortex reducer of an embodiment.
Figure 7A:
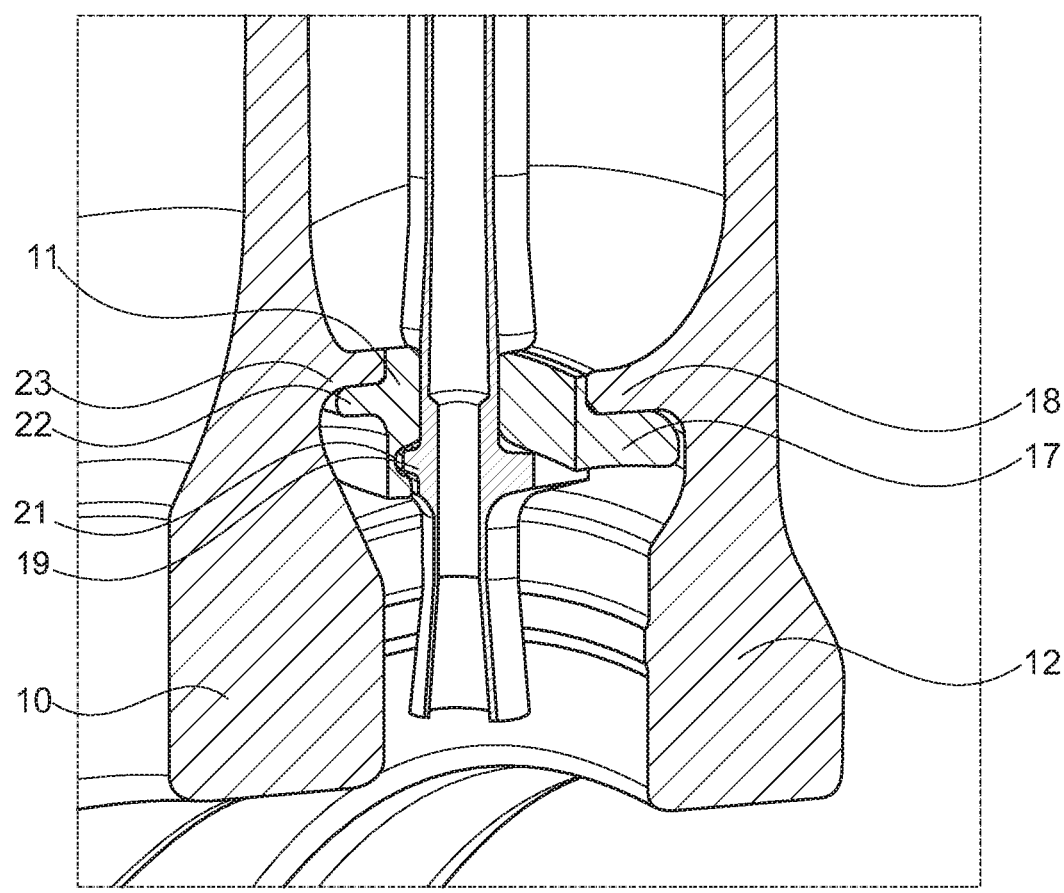
FIG. 7A shows a perspective rendering of the embodiment according to FIG. 7 in partial section.

FIG. 7 shows a sectional view through an embodiment with two rotor discs 10, 12 and vortex reducers 1 (with only one being visible in section here) in the assembled state (that is, the second mounting state). FIG. 7A shows the embodiment in a partially cut-away, three-dimensional view.

Here, particularly the hub area is shown in detail. Here too, a retaining ring 11 is used as a first structural component in order to provide first scallops 13. What is particularly shown in FIGS. 7 and 7A is the attachment of the vortex reducer 1 to the rotor discs 10, 12. The upstream first rotor disc 10 is made of titanium, and the downstream second rotor disc 12 is made of nickel. The connection of the retaining ring 11 to the first rotor disc 10 is realized via a transition fit, while the connection to the second rotor disc 12 is realized via a press fit.

Thus, a press fit is present between the circumferential first projection 17 of the retaining ring 11 and the circumferential second projection 18 of the second rotor disc 12. This means that the circumferential first projections 17 of the retaining ring 11 are fit below the correspondingly shaped counterparts, the circumferential second projections 18 of the second rotor disc 12, as part of a press fit.

The connection of the retaining ring 11 to the first rotor disc 10 is realized via a transition fit or clearance fit. For this purpose, the retaining ring 11 has a circumferential second projection 22, which in the present case engages in a circumferential projection 23 (cantilever) of the first rotor disc 10.

The diameter of the inner part (that is, the part with the first projections 17) is always larger than the respective bore, that is, the part with the second projections 18. Through this press-fitted connection, a secure axial connection is established between the rotor discs 10, 12.

A ledge 19, that is, a bulge, is arranged at the radial bottom end of the vortex reducer 1, retaining the vortex reducer 1 radially outwards against the border of the scallops 13. The ledge 19 engages in a groove 21 of the retaining ring 11. Thus, the vortex reducer 1 is retained in the radial direction by form-fitting means of the groove 21 and of the ledge 19. The ledge 19 is retained radially at the bottom side of the retaining ring 11 and is located inside the groove 21 such that it does not fall out. The planar faces of the ledge 19 abut against the groove 21 and thus prevent any rotation of the vortex reducer 1.

Figure 8:
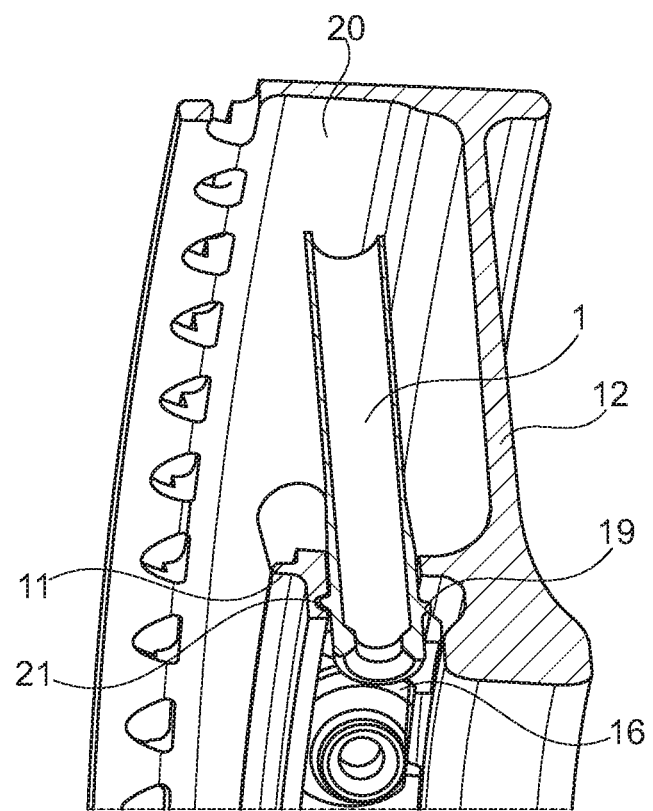
FIG. 8 shows a perspective view through the attachment area of the vortex reducer according to FIG. 7, but without the first rotor disc.

The situation of FIG. 7, 7A is shown in FIG. 8 once more in a perspective sectional view, wherein the first rotor disc 10 is not shown here for reasons of simplification. Here, a vortex reducer 1 is shown in section, partially covering the vortex reducer 1 that is located behind it. For this rear vortex reducer 1, the means for rotation prevention 16 as it has already been described above can be clearly seen.

Figure 9:
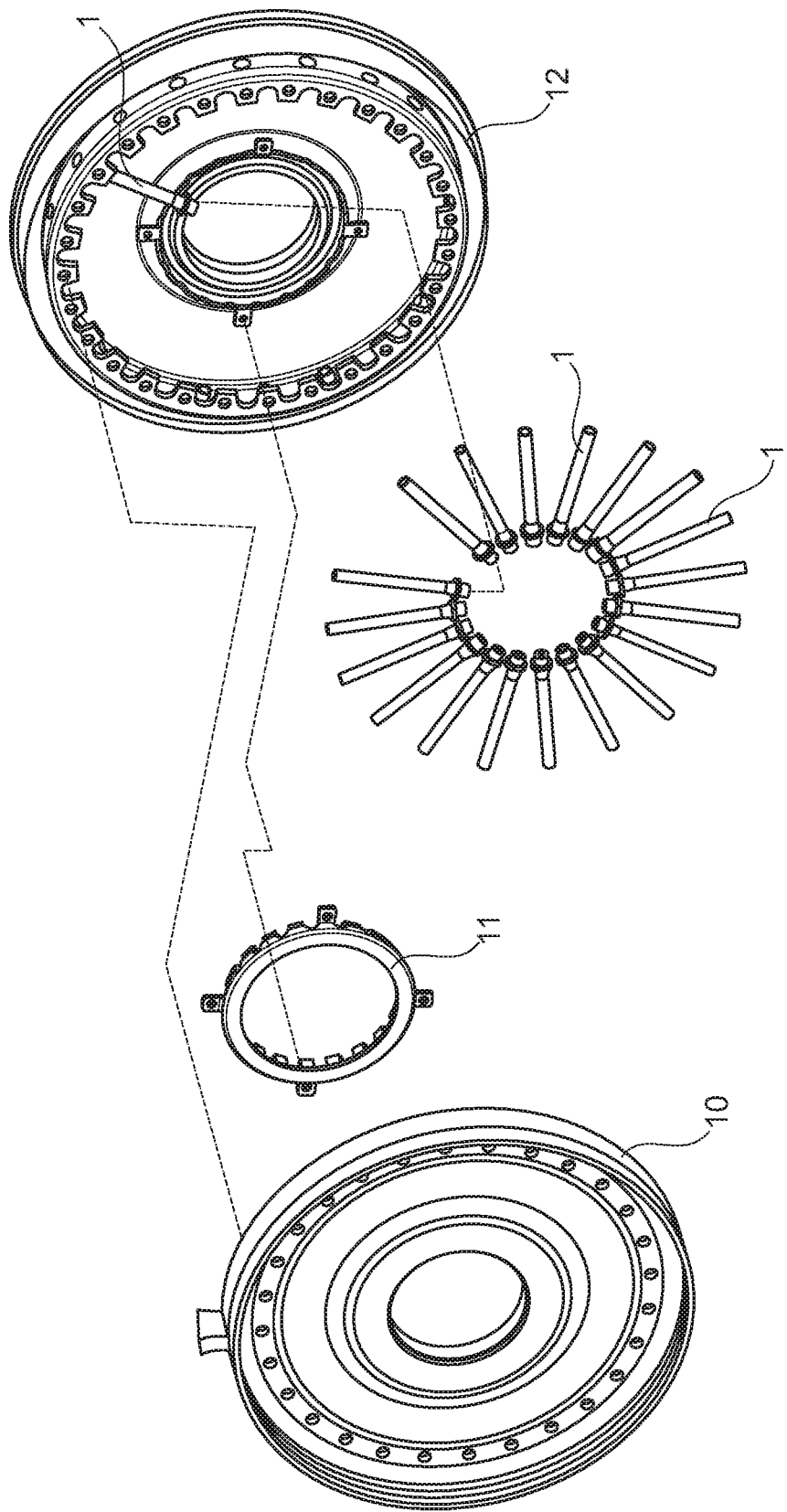
FIG. 9 shows an exploded drawing illustrating an embodiment of the mounting process.

In FIG. 9, parts of the mounting bracket of the vortex reducers 1 are shown in an exploded drawing, such that the method for mounting is illustrated.

The vortex reducers 1 are retained between the retaining ring 11 and the second rotor disc 12. The retaining ring 11 is in turn connected to the first rotor disc 10.

The vortex reducers 1 are inserted into the second scallops 14 of the second rotor disc 12. Alternatively, it is also possible to insert the vortex reducers 1 into the first scallops 13 of the retaining ring 11.

Subsequently, either the second rotor disc 12 with the second scallops 14 is connected to the retaining ring 11 with the first scallops 13. Alternatively, the retaining ring 11 with the first scallops 13 is connected to the axially adjacent structural component 12.

Subsequently, the first rotor disc 10 is connected to the retaining ring 11 and the second rotor disc 12.

In this way, the vortex reducers 1 are connected to the rotor discs 10, 12 via the scallops 13, 14 in a form-fitted and/or in a force-fitted manner in any case following the assembly.

Figure 10:
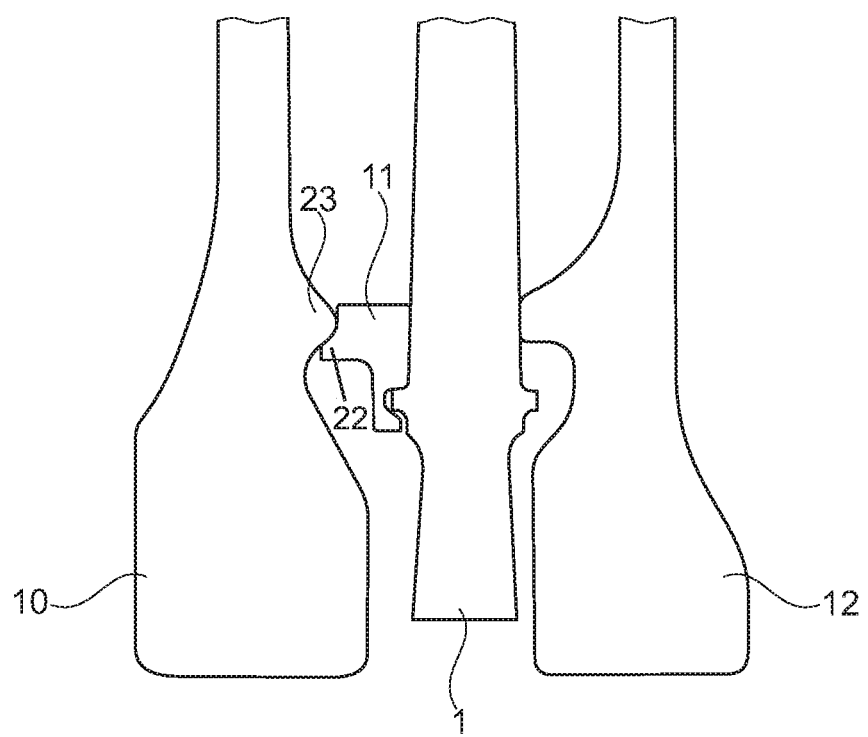
FIG. 10 shows a further embodiment with a conical connection between the retaining ring and the first rotor disc.
Figure 11:
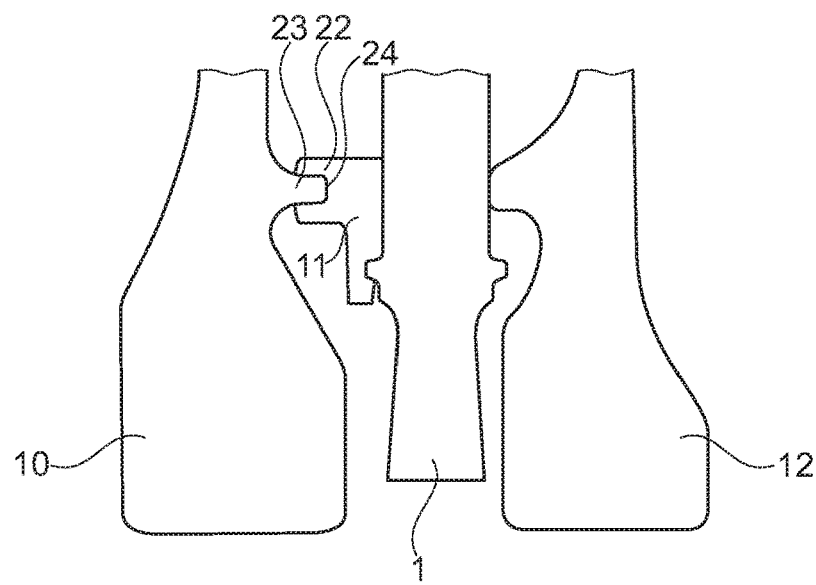
FIG. 11 shows a further embodiment with a form-fitted connection between the retaining ring and the first rotor disc.
Figure 12:
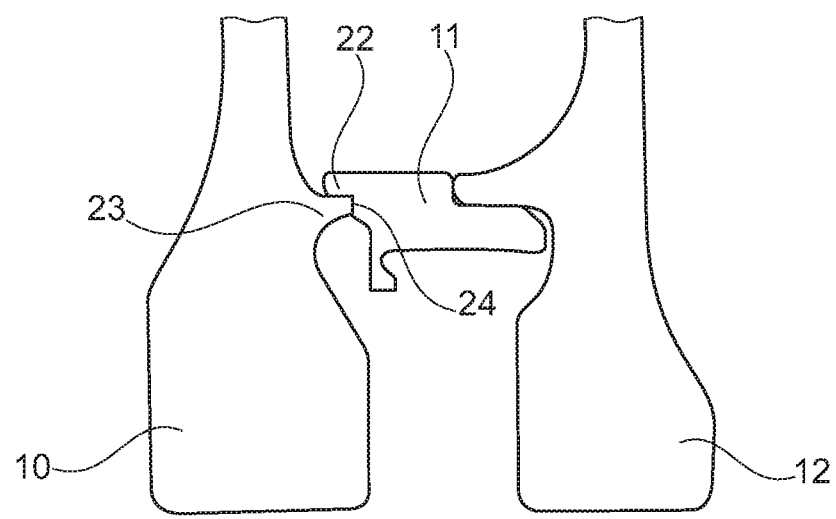
FIG. 12 shows a further embodiment with a force-fitted connection between the retaining ring and the first rotor disc.

FIGS. 10 to 12 show further embodiments in which the connection between the retaining ring 11 and the first rotor disc 10 can be varied.

Figure 10A:
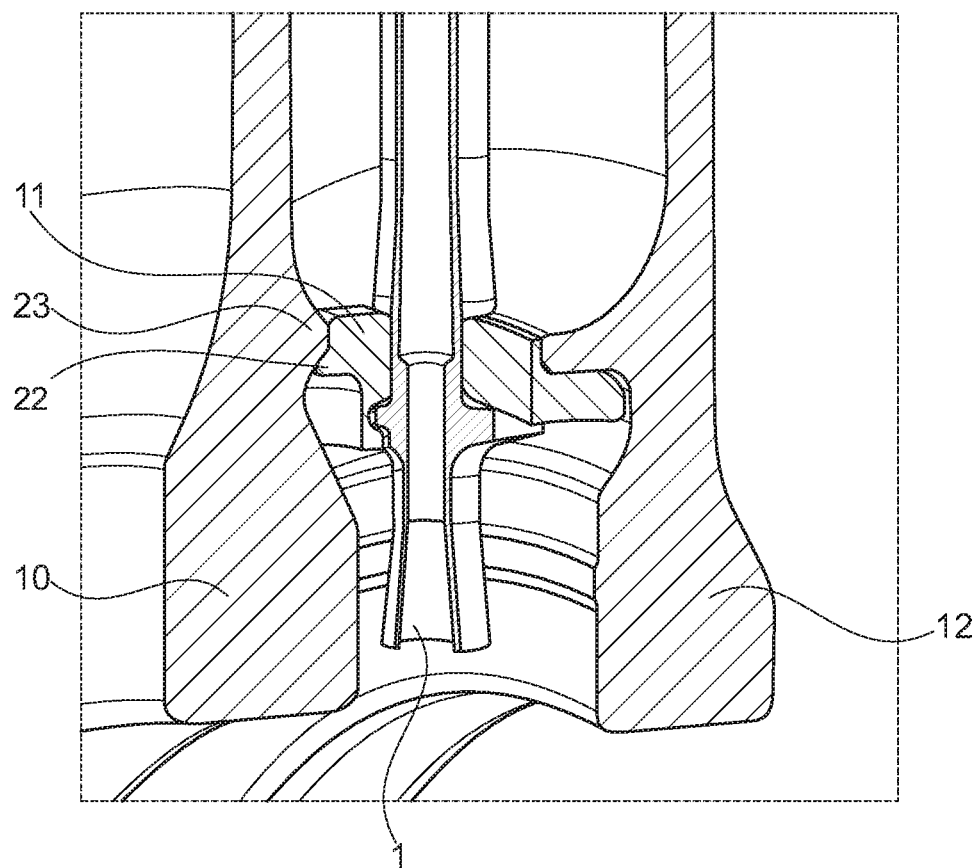
FIG. 10A shows a perspective rendering of the embodiment according to FIG. 10 in partial section.

In the embodiment according to FIGS. 10 and 10A, the circumferential second projection 22 of the retaining ring 11 is formed in such a manner that it has a circumferentially conical shape. This conical projection 22 acts together with the likewise conically shaped projection 23 of the first rotor disc 10. Through the conical seating, a certain degree of self-centering of the retaining ring 11 and the first rotor disc 10 is possible. In addition, an enhanced sealing effect is achieved due to the conical contact surface.

Figure 11A:
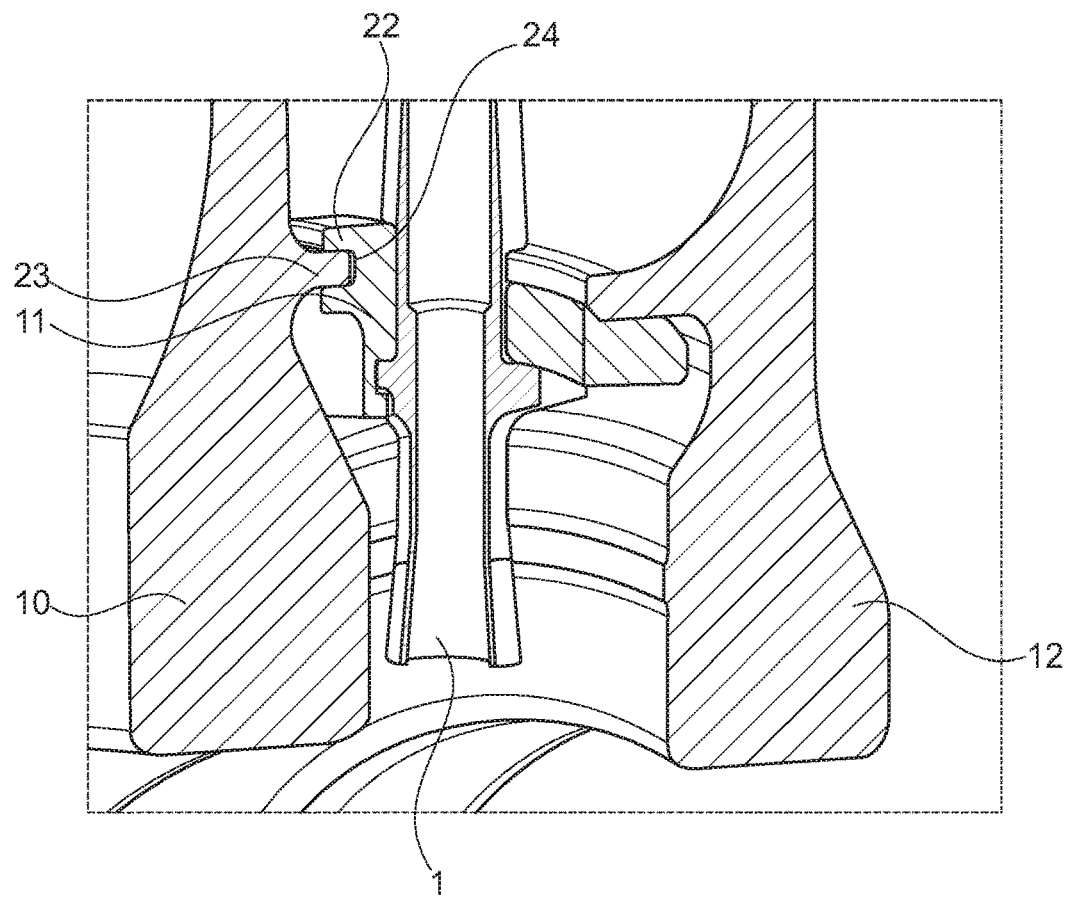
FIG. 11A shows a perspective rendering of the embodiment according to FIG. 11 in partial section.

In the embodiment according to FIGS. 11 and 11A, the retaining ring 11 is configured differently on the side facing towards the first rotor disc 10. The retaining ring has a circumferential second groove 24, inside of which the circumferential projection 23 (cantilever) of the first rotor disc 23 is arranged. Due to the double-sided edging of the projection 23, this embodiment, which is also referred to as a bird-mouth connection, has a special sealing effect.

In FIG. 12, a further variation of the connection between the retaining ring 11 and the first rotor disc 10 is shown. Here, the second projection 22 of the retaining ring 11 is located above the projection 23 (cantilever) of the first rotor disc 10. The retaining ring 11 can be made of titanium, for example.

In the exemplary embodiments, reference is made to the circumferential projections or grooves. This means that the projections or grooves are present at least across parts of the circumference of the structural component.

Figure 13:
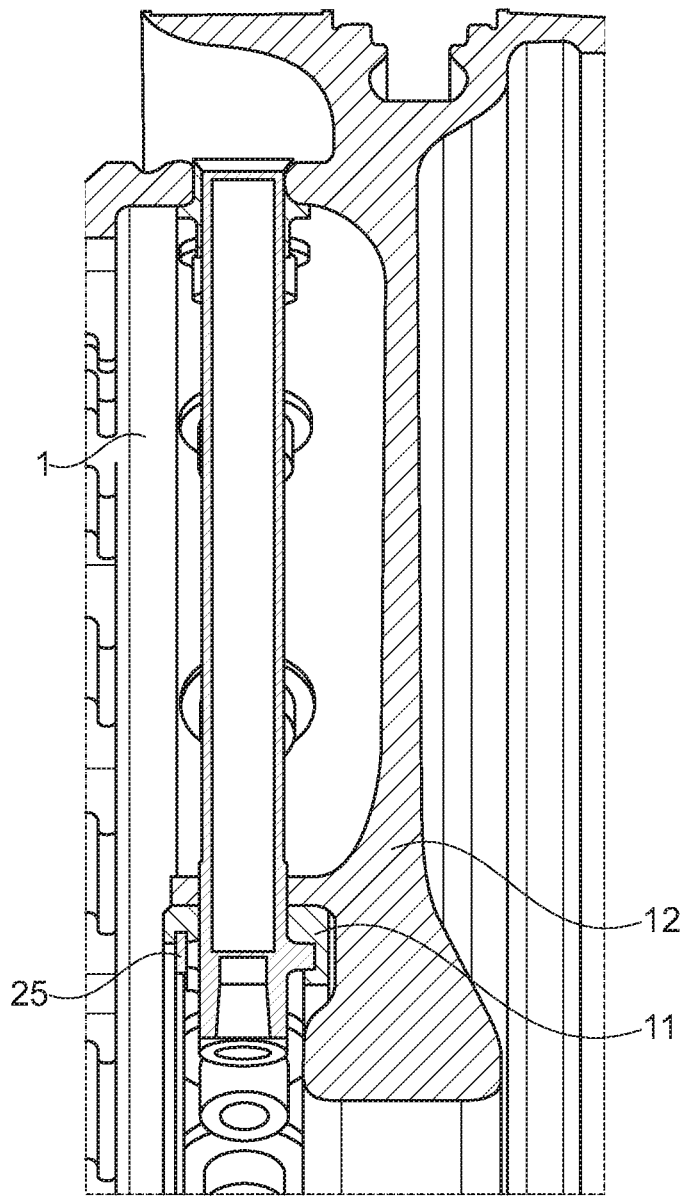
FIG. 13 shows a further embodiment with a circlip.

FIG. 13 is an embodiment in which a circlip 25 serves for securing the vortex reducer 1 against any rotation. For this purpose, the circlip 25 is inserted into a radially circumferential groove of the retaining ring 11.

It should also be noted that the so-called cobs are formed in an asymmetrical manner in the radially inner, wider area of the rotor discs, in particular of the upstream rotor disc 10 (see FIG. 7A, 10, 10A, 11, for example).

PARTS LIST 1 vortex reducer
10 first rotor disc
11 first structural component, e.g. retaining ring
12 second structural component, e.g. second rotor disc
13 first scallops
14 second scallops
15 form-fitting means
16 means for rotation prevention
17 first projection at the first structural component, e.g. retaining ring
18 second projection at the second rotor disc
19 ledge at the vortex reducer (form-fitting means)
20 space adjacent to a rotor disc of the compressor
21 first groove at the retaining ring (form-fitting means)
22 second projection at the first structural component, e.g. retaining ring
23 projection at the first rotor disc
24 second groove at the retaining ring for connecting to first rotor disc
25 circlip
100 turbomachine, aircraft engine
101 compressor
102 combustion chamber
103 turbine
A flow direction
D rotational axis of the compressor

The invention claimed is:

1. A compressor for a turbomachine, comprising:
a first rotor disc;
a space that is enclosed at least partially by the first rotor disc, wherein the space is arranged axially in front of or behind the first rotor disc;
a retaining ring arranged circumferentially around a center axis of the compressor, wherein the retaining ring is axially apart from the first rotor disc and adjacent to the space, wherein the retaining ring further comprises a first scallop, and wherein the retaining ring includes an end portion axially opposite the first scallop;
a second rotor disc arranged axially apart and adjacent to the retaining ring and wherein the second rotor disc further comprises a second scallop;
a vortex reducer arranged inside the space, wherein the first scallop of the retaining ring and the second scallop of the second rotor disc engage cooperatively to connect the vortex reducer, wherein the vortex reducer is connected partially via the first scallop and partially via the second scallop in at least one chosen from a form-fitted and a frictionally engaged manner;
wherein a connection between the retaining ring and the second rotor disc is realized via a press fit; and
wherein the end portion of the retaining ring is connectable to the first rotor disc.

2. The compressor according to claim 1, wherein the vortex reducer is connected partially via the first scallop and partially via the second scallop in at least one chosen from a clamp connection, a press fit and a transition fit.

3. The compressor according to claim 1, further comprising at least one chosen from a ledge at the vortex reducer and a groove in at least one chosen from the first scallop and the second scallop.

4. The compressor according to claim 1, wherein the end portion of the retaining ring is connectable to the first rotor disc via one chosen from a clearance fit and a transition fit.

5. The compressor according to claim 1, wherein the vortex reducer is coupled to an anti-rotation device.

6. The compressor according to claim 5, wherein the anti-rotation device is respectively configured as a circumferential ring at the vortex reducer, wherein the circumferential ring has at least one planar face which abuts against a wall.

7. The compressor according to claim 1, wherein the vortex reducer is configured in a tube design.

8. The compressor according to claim 1,
wherein the end portion of the retaining ring further comprises at least one chosen from a circumferential second groove and a conical seating; and
wherein the first rotor disc further comprises a circumferential projection connectable to the at least one chosen from the circumferential second groove and the conical seating.

9. The compressor according to claim 1, wherein the first rotor disc further comprises a radially inner, wider area configured in an asymmetrical manner.

10. An aircraft engine with a compressor according to claim 1.

11. A method for mounting a compressor with a vortex reducer, wherein the method comprises:
providing a compressor including:
a first rotor disc;
a space that is enclosed at least partially by the first rotor disc, wherein the space is arranged axially in front of or behind the first rotor;
a retaining ring arranged circumferentially around a center axis of the compressor, wherein the retaining ring is axially apart from the first rotor disc and adjacent to the space, wherein the retaining ring further comprises a first scallop, and wherein the retaining ring further comprises an end portion located axially opposite the first scallop;
a second rotor disc arranged axially apart and adjacent to the retaining ring and wherein the second rotor disc further comprises a second scallop;
arranging a vortex reducer inside the space, wherein the vortex reducer is inserted into one chosen from the first scallop and the second scallop;
connecting the first scallop and the second scallop, wherein the vortex reducer is connected partially via the first scallop and partially via the second scallop in at least one chosen from a form-fitted and a frictionally engaged manner;

wherein a connection between the retaining ring and the second rotor disc is realized via a press fit; and wherein the end portion of the retaining ring is connectable to the first rotor disc.

* * * * *